Feb. 12, 1935.  F. E. E. BOOSS  1,990,976

PROTECTING DEVICE FOR STORAGE BATTERY PLATES

Filed June 11, 1931

Inventor,
Frederick E. E. Booss.
By Ernest F. Mechlin
Attorney

Patented Feb. 12, 1935

1,990,976

UNITED STATES PATENT OFFICE 1,990,976

PROTECTING DEVICE FOR STORAGE BATTERY PLATES

Frederick E. E. Booss, Lancaster, N. Y., assignor to Gould Storage Battery Corporation, Depew, N. Y., a corporation of Delaware Application June 11, 1931, Serial No. 543,722

2 Claims. (Cl. 136—147)

The invention relates to a guard for storage battery plates of the pasted grid type and especially to such plates which are associated with pads or blankets of inert fibrous material, such as spun glass, overlying the faces thereof, said guard comprising an envelope of perforate inert sheet material, preferably hard rubber, adapted to be applied in telescopic engagement with the plate and blankets, whereby the blankets are retained in close engagement with the faces of the plate, and the active filling material, which would tend to disintegrate and fall away from the plate under varying service conditions, will be retained in the plate and the life of the latter and the battery in which it is employed is materially prolonged and the liability of short circuiting is almost completely obviated.

The invention is illustrated in the accompanying drawing, in which:—

Figure 1:
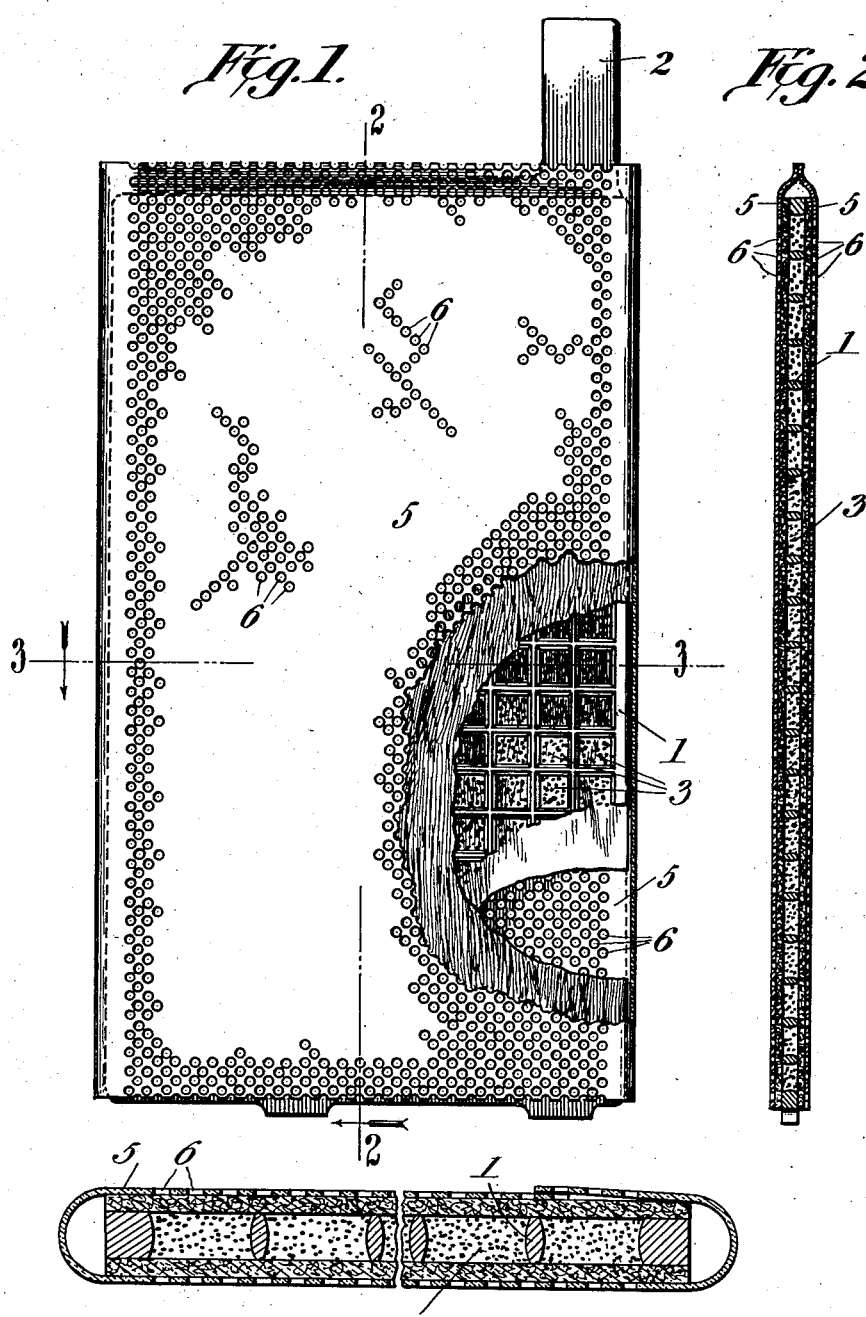
Fig. 1 is a front elevation, partly in broken section, of a typical battery plate associated with the fibrous blankets and the telescoping guard.
Figure 2:
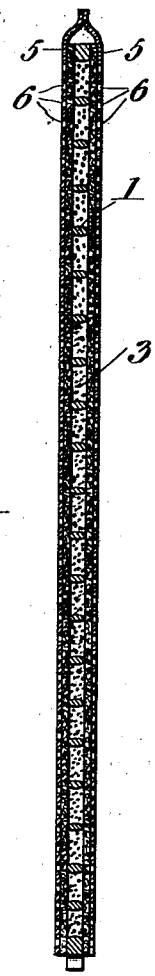
Fig. 2 is a section on line 2—2 of Fig. 1.
Figure 3:
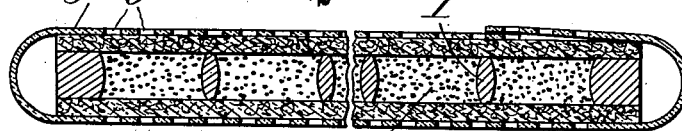
Fig. 3 is an enlarged section on line 3—3 of Fig. 1.

Referring to the drawing, 1 indicates the grid or frame of the battery plate, which may be of any suitable shape or size, provided with a terminal 2. It will be understood that the interstices of the grid are filled with the active material usually employed for this purpose, which material has been partly omitted from Fig. 1 in order to more clearly illustrate the relation and arrangement of the other elements, said filling material, however, being indicated at 3 in Figs. 2 and 3 as completely filling the interstices of the grid.

In storage batteries of approved type, it is customary to cover the faces of the plate with pervious pads or blankets 4, preferably formed of inert fibrous material, such as spun glass, to serve as retainers for the filling material of the grids, as such filling material tends to disintegrate or crumble under the repeated cycling of the battery in which the plate is employed. It has been proposed to retain the pads or blankets in position by various means, including separators of perforate or foraminated sheet material engaging the outer faces of the blankets and held in position by the juxtaposition of the plates of the battery with the usual interposed wooden separators. While these perforate guard sheets or separators have proven eminently satisfactory for the particular purposes for which they were designed, they are liable to displacement under service conditions, resulting in a displacement of the fibrous pads or blankets with the result that the latter fail as retainers to keep the filling material of the plate in proper relation in the grid, thereby impairing the efficiency of the plate and ultimately destroying its usefulness, and the possible destruction of the battery in which the plate is employed, due to short circuits set up by the disintegrated filling material.

The present invention is designed to provide a guard having all of the advantages of the foraminous sheet separator, together with many other advantages that the latter does not possess, such as affording a complete telescoping envelope enclosing the plate and the juxtaposed fibrous pads or blankets, so that the assembled plates, pads and guards may be applied to and removed from the battery with ease and facility and with the assurance that the pads or blankets will be retained in proper engaging relation with the faces of the plates at all times and the danger of disintegration of the filling material of the plates and falling out of the latter and resultant short circuiting, will be completely obviated.

As illustrated, the guard comprises, in its preferred form, a shell or envelope 5 of sheet material, preferably hard rubber, fashioned in the form of a flat faced tube or casing, which closely surrounds the assembled plate and juxtaposed pads or blankets 4, so that the latter will be retained in proper relation for engagement with the filling material. The bottom of the guard is left open, so that the guard may be telescopically engaged with the plate and juxtaposed pads, while the top of the guard is preferably closed by crimping the edges together, except for an opening left therein to permit passage of the plate terminal 2. The flat front and rear faces of the guard are provided with a multiplicity of relatively small perforations 6, which permit the ready circulation of the electrolyte, and the side walls of the guard are preferably imperforate and spaced from the lateral edges of the plate and juxtaposed pads or blankets to permit any unavoidable expansion of these elements without disturbing their proper juxtaposed relation.

The guard is preferably formed by folding a sheet of hard rubber, provided with the perforate sections, into a flat faced tubular or case-like formation with the vertical edges overlapping and united by any appropriate means, such as a suitable cement, or, if desired, in the vulcanizing operation, the top of the guard being closed by crimping and uniting the marginal edges of the top, in the manner shown in the drawing, except for a section of the top which is left open for the passage of the terminal lug 2 of the plate.

What I claim is:

1. In combination, a storage battery plate having an upstanding lug at one upper corner, glass wool mats located at opposite sides thereof in coextensive relation thereto and flatly contacting therewith throughout their areas, and an envelope formed from a single sheet of hard rubber and of elongated tubular form in cross section with lapped edges and having flat parallel sides connected by arcuate vertical end portions, said envelope surrounding said plate and said mats as an assembly, the parallel sides of said envelope lying flatly against the outer surfaces of said mats and contacting therewith throughout their areas, said parallel sides of the envelope being perforated, said vertical end portions curving outwardly in spaced relation to the edges of the plate and mats, said envelope having an open bottom located at the bottom edges of the plate and mats and having its upper edge projecting upwardly beyond the top edge of the plate and mats and closed except for a distance sufficient to accommodate said lug.

2. In combination, a storage battery plate having an upstanding lug at its upper edge, separators located at opposite sides of the plate in coextensive relation thereto and flatly contacting therewith throughout their areas, and a penetrable envelope formed of a single piece of material and of elongated tubular form in cross section with flat parallel sides connected by vertical end portions, said envelope surrounding said plate and said separators as an assembly, the parallel sides of said envelope lying flatly against the outer surfaces of said separators and contacting therewith throughout their areas, said vertical end portions of the envelope extending outwardly in spaced relation to the edges of the plate and separators, said envelope having an open bottom located at the bottom edges of the plate and separators and having its upper edge projecting upwardly beyond the top edges of the plate and separators and closed except for a distance sufficient to accommodate said lug.

FREDERICK E. E. BOOSS.